Jan. 23, 1962 G. MOUNTJOY 3,018,367
SPEED CONTROL SYSTEM UTILIZING FREQUENCY
CHANGE FROM INDUCTIVE PICKUP
Filed May 6, 1959 2 Sheets-Sheet 1
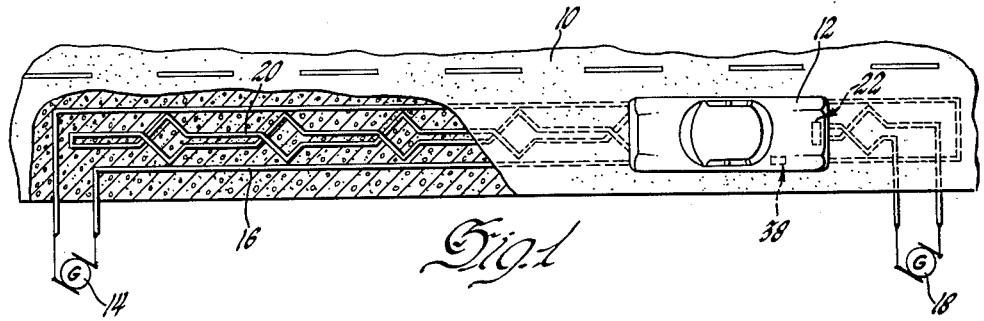
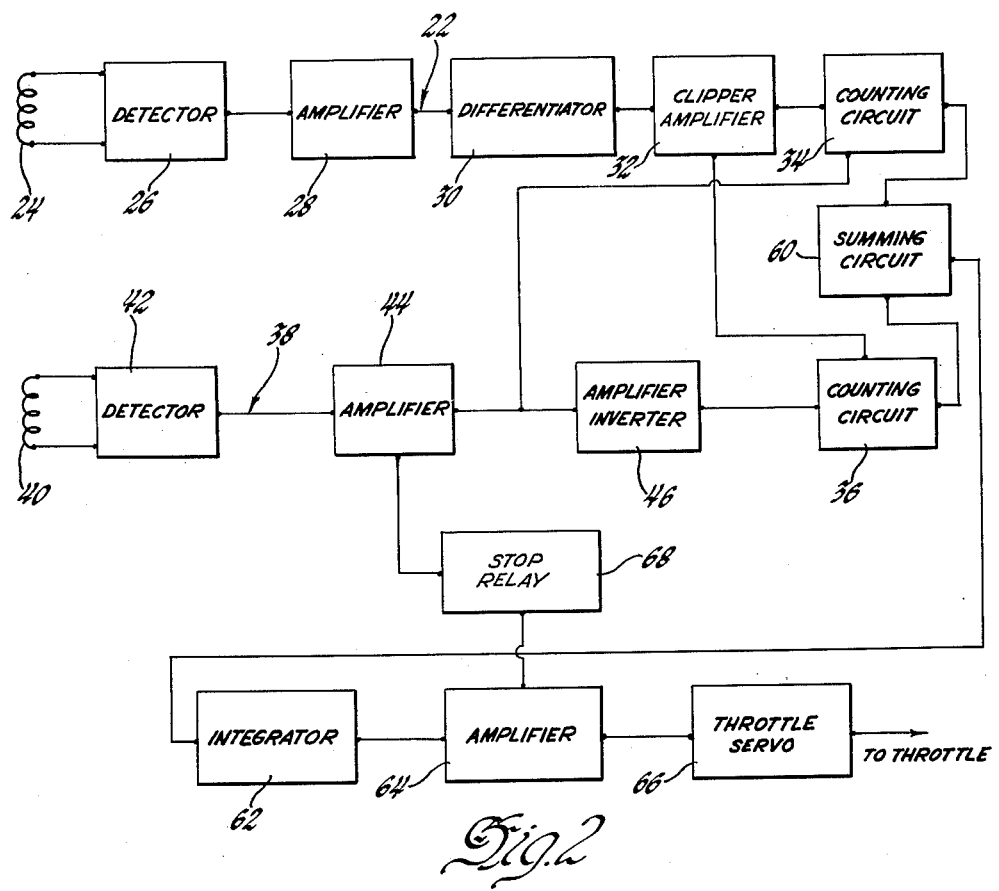
INVENTOR.
Garrard Mountjoy
BY
Hugh L. Fisher
ATTORNEY Jan. 23, 1962  G. MOUNTJOY  3,018,367
SPEED CONTROL SYSTEM UTILIZING FREQUENCY
CHANGE FROM INDUCTIVE PICKUP
Filed May 6, 1959  2 Sheets-Sheet 2
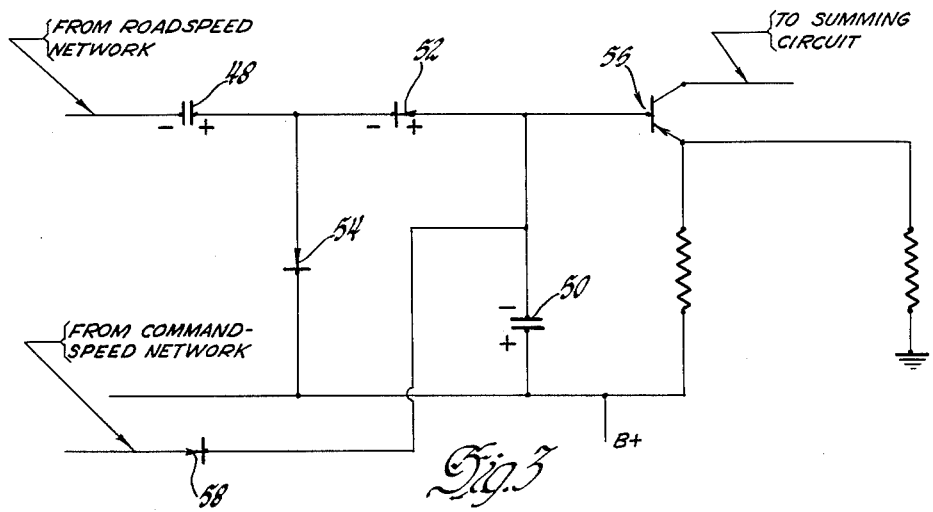
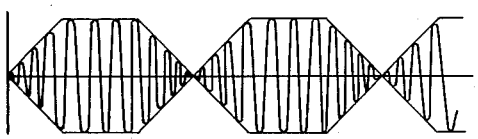
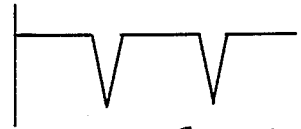
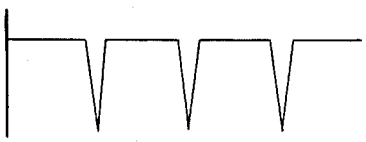
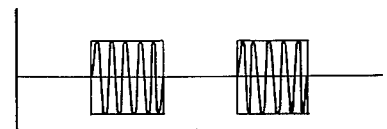
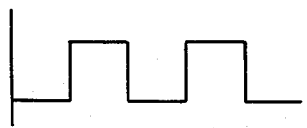
INVENTOR.
Garrard Mountjoy
BY
Hugh L. Fisher
ATTORNEY

United States Patent Office 3,018,367
Patented Jan. 23, 1962

3,018,367
SPEED CONTROL SYSTEM UTILIZING FREQUENCY CHANGE FROM INDUCTIVE PICKUP
Garrard Mountjoy, Little Rock, Ark., assignor to General Motors Corporation, Detroit, Mich., a corporation of Delaware
Filed May 6, 1959, Ser. No. 811,489
15 Claims. (Cl. 246—182)

This invention relates generally to speed control systems and particularly to speed control systems adapted, although not exclusively, for use with motor vehicles.

Among the many concerns of any traffic control system is the regulation of vehicle speed. For instance, the nature of a section of roadway may be such that it is necessary to limit speeds either for purposes of safety or to maintain constant road speeds over certain sections of the roadway so as to provide smooth traffic flow particularly during rush hours. It can be seen that it is advantageous to be able to regulate vehicle speeds over these sections of roadway by external means, i.e., means outside the vehicle and from some central station. With such use of external means, if driving conditions change, due to weather for example, the speed permitted over these sections of roadway can be accordingly adjusted.

Systems have been proposed for accomplishing this external control electronically, but these systems have not been always acceptable due to failures in communication and because complex and costly equipment was required. Also, the calibration of electronic controls with respect to some reference or desired command speed presents problems, especially if the reference is built into the vehicle carried equipment. If built in, deterioration of the electronic components from wear, etc. causes the reference to change and induce undesired errors into the system.

With the foregoing in mind, the invention contemplates a vehicle speed control system that relies on an external source of signal energy for establishing a reference or desired command speed. More particularly, the invention seeks to provide a vehicle speed control system that, in addition to having the external signal energy for establishing a desired command speed impressed thereon, also has another external signal source associated therewith for determining actual vehicle speed, that compares the two signals by means of novel vehicle carried apparatus, and that as a result of such comparison controls vehicle movement.

Specifically, the invention seeks to provide the aforementioned vehicle speed control system with vehicle carried apparatus that counts generated signal pulses, the frequency of which corresponds to vehicle speed, and compares the frequency of these signal pulses with signal pulses of a frequency corresponding to the desired command speed.

Another related and more specific objective of the invention is to utilize in a unique way a step by step counter that counts peaked wave form pulses corresponding in frequency to actual vehicle speed for intervals determined by signals corresponding to the desired command speed. The output from the counter is then employed to control vehicle movement.

The foregoing and other objects and advantages of the invention will be apparent from the following description and from the accompanying drawings in which:

FIGURE 1 depicts a section of a roadway utilized in demonstrating the invention;
FIGURE 2 is a block diagram of vehicle carried apparatus incorporating the principles of the invention;
FIGURE 3 is a diagram of one of the counting circuits incorporated in the vehicle carried apparatus; and
FIGURES 4, 5, 6, 7, and 8 illustrate voltage wave forms occurring at designated points in the FIGURE 2 block diagram.

Referring to the drawings, the numeral 10 indicates a roadway for a vehicle 12. Situated along the roadway 10 is a command speed signal generator 14 that is adapted to develop a carrier wave keyed or suitably modulated at a frequency corresponding to some desired command speed, e.g., 60 m.p.h. This frequency can be varied in a known way so as to permit the command speed to be changed for different driving conditions along selected sections of the roadway 10. The placement and the number of generators will, of course, be determined by the environment and the type of roadway. The command speed signal generator 14 is connected to a sending transducer such as a command speed signal cable 16 embedded in the roadway 10 and arranged parallel to vehicle movement so that signal energy is transmitted therealong. This signal energy, in turn, produces in a known manner a magnetic field above the surface of the roadway 10. Also situated along the roadway 10 is a control or road speed signal generator 18 so constructed as to develop an unmodulated carrier wave for delivery to another sending transducer such as a road speed signal cable 20. As with the command speed signal cable, the road speed signal cable 20 is aligned with the path of movement of the vehicle 12. As can be seen in FIGURE 1, the road speed signal cable 20 is of a criss-cross configuration so as to afford alternate zones of high and low road speed signal intensities, the low intensity zones occurring at the crossover points for the cable 20.

Therefore, as will be explained, movement of the vehicle 12 over the road speed signal cable 20 and the command speed signal cable 16 will induce respectively road speed and command speed signal voltages in vehicle carried apparatus. These signal voltages are then utilized in proportioning the vehicle road speed to the command speed.

Considering first the road speed network indicated generally at 22 this network, as can be viewed in FIGURE 1, is positioned on the vehicle 12 so as to be above the road speed signal cable 20 and within the magnetic field thereof. The network 22 then utilizes a receiving transducer, e.g., a road speed signal pickup winding 24 that is so positioned and arranged on the vehicle 12 that as the vehicle 12 moves along the roadway 10, the winding 24 will have a signal voltage induced therein. This signal voltage, which will hereinafter be referred to as a road speed signal voltage, is modulated so as to have a frequency corresponding to the rate at which the winding 24 passes through the zones of high and low signal intensity thereby producing a wave form something like that depicted in FIGURE 4. The road speed signal voltage so developed will be transferred through a detector or demodulating circuit 26 and result in the demodulated wave from illustrated by FIGURE 5. Next, the signal voltage will be applied respectively to an amplifier 28, a differentiator 30, and a clipper amplifier 32. The clipper amplifier 32 is utilized to remove pulses of one polarity and to produce output peaked pulses of constant amplitude corresponding to the other polarity. These output peaked pulses, which have the FIGURE 6 wave form and correspond in frequency to road speed, are delivered to counting circuits 34 and 36.

The command speed network shown generally at 38 is positioned on the vehicle 12 so as to be adjacent the command speed signal cable 16 and, as with the road speed network 22, includes a receiving transducer in the form of a pickup winding 40. It is preferred that signal energy from the command speed signal cable 16 induce in the winding 40 a signal voltage of the FIGURE 7 wave form. Then after applying this signal voltage to a detector or demodulating circuit 42, the square wave form pulses demonstrated in FIGURE 8 will be produced. This so-called command speed signal voltage may be increased by an amplifier 44 before being impressed on counting circuit 34. At this point an amplifier inverter 46 is employed so that the command speed signal voltage delivered to the counting circuit 36 will be out of phase, preferably 180° out of phase for reasons that will become apparent, with respect to the signal voltage delivered to the counting circuit 34.

Both of the counting circuits 34 and 36 are in this embodiment of the FIGURE 3 type and each comprises a coupling capacitor 48, a counting capacitor 50, and two diodes 52 and 54 all arranged as depicted. For explanatory purposes and without limitation, plus and minus signs have been assigned as denoted to aid in describing the circuit. The peaked wave form pulses, in this example negative, when applied to the coupling capacitor 48 will develop a negative going voltage across the counting capacitor 50, this being permitted by the orientation of diode 52. Between each pulse the coupling capacitor 48 will discharge through bypass diode 54 and the charge on the counting capacitor 50 will normally be maintained by the blocking action of the diode 52. Hence, each successive pulse will cause the charges on the capacitor 50 to build up in exponential steps and to produce a corresponding stepped potential across the counting capacitor 50. As is well known, this buildup of potential can increase until the circuit becomes insensitive to any further increase. However, in this embodiment, a semiconductor as transistor 56 either of an NPN or the PNP type depicted is arranged so as to have applied thereto the net potential across the counting capacitor 50. Also, an electronic switching action afforded by the command speed signal voltage causes the counting capacitor 50 to be reset after erasing part or all of the charge on capacitor 50 thereby enabling the circuit to recommence counting.

To accomplish the switching action, the command speed network 38 is connected through a blocking diode 58 to the negative side of the counting capacitor 50. When the counting capacitor is being charged in the just described manner, the command speed signal voltage is off, i.e., the command speed signal voltage is along the FIGURE 8 zero potential line appearing between the square wave form signals. The charge on the counting capacitor 50 then will be entirely or partially erased as the charge is bled off through the blocking diode 58 to some area of lower potential as ground. If all of this charge can be bled off during the interval that the command speed signal voltage is off, the status of the transistor 56 will not be altered because the net voltage applied thereto will not be changed. But, if the charge on the counting capacitor 50 is not entirely removed, during this off interval, of course, a net voltage will be applied to the transistor 56 and thereby change the operating status thereof.

Continuing with the explanation of the counting circuits 34 and 36, when the command speed signal voltage is on, i.e., a square wave form pulse is received, the switching action occurs and the counting capacitor 50 is reset. This can be produced by applying the same voltage to the negative side of the capacitor 50 as is applied to the positive side. In this instance, battery voltage is applied to the negative side of the counting capacitor 50 whereas this same battery voltage is continuously applied to the positive side of the counting capacitor 50. As a result, the counting capacitor 50 will not accept a charge and the counting cannot recommence until the command speed signal voltage is again off.

As will become more apparent in the operational summary, this counting arrangement can be changed considerably to meet the requirements of a particular application. In this embodiment, two counting circuits 34 and 36 are employed and since the command signal voltage to one is 180° out of phase relative to the other, more pulses from the resultant continuity are produced, and accordingly a stronger output. Some applications may only require one such counter if the output is adequate.

Because two counting circuits are employed, a summing circuit 60 is employed so as to sum the outputs from each. This summed output voltage may be utilized directly or as in the present embodiment delivered to an integrator 62 or an equivalent, so as to produce an equivalent D.C. voltage that is further increased by an amplifier 64 and then applied to a throttle servo 66. The amplified D.C. voltage will cause the throttle servo 66 in an appropriate way to alter the throttle setting so that road speed will approximate if desired or be in some predetermined proportion to the selected command speed of 60 m.p.h.

In summarizing, the operation of the control system will be so described as to cover two possible conditions. In one of these it will be assumed that road speeds in excess of the desired command speed are the only concern. The other condition assumes that road speeds both in excess and less than command speed are to be considered.

Taking first the condition where only excess road speeds are to be considered and referring to the FIGURE 3 counting circuit, it will be assumed then that if road speed and command speed are equal, the corresponding frequencies of the peaked wave form pulses and the square wave form pulses will also be equal. Consequently, the FIGURE 3 counting circuit will be so calibrated when road speed and command speed are equal that the counting capacitor 50 will only receive one charge during the interval the command signal is off and this one count or single charge will be completely erased and the counting circuit reset before any net voltage across the counting capacitor 50 can be developed. Therefore, the status of transistor 56 will remain unaltered. If, now, the road speed commences to exceed the command speed, more than one of the peaked wave form pulses will occur during the interval that the command speed signal voltage is off. For this reason, the counting circuits 34 and 36 will be further calibrated so that all of this charge cannot be removed in the time interval permitted and a net voltage developed across the counting capacitor 50 will change the output of the transistor 56.

It will be assumed here that the throttle servo 66 when under the influence of this automatic control, will be maintained in an appropriate way by the command speed signal voltage in a setting that will produce the desired command speed. When the road speed is equivalent to command speed, there can be either no output or some selected output from the counting circuits 34 and 36 and this will be determined by the bias on the transistors 56. If there is an output, it will have to be correlated with the command speed signal voltage so as to maintain the throttle servo 66 in the command speed setting. Whether or not there is an output when road speed and command speed are equal, there will be an output from the counting circuits 34 and 36 when road speed exceeds command speed such that, after being summed by the summing circuit 60 and processed by the integrator 62 and the amplifier 64, the amplified equivalent D.C. voltage will cause the throttle servo 66 to reduce the throttle opening until vehicle speed again approximates command speed.

Assuming that the other operating condition is to be covered by the system, namely, that when under automatic control, road speeds both above and below the command speed are to be considered, this can be accomplished by altering the basic system in different ways as will be understood by those versed in the art. One way of accomplishing this would be to have the throttle servo 66 adjusted so as to approximate the throttle opening at command speed. As before, this setting could be maintained by the command speed signal voltage; then the counting circuits 34 and 36 could be so calibrated that when road speed and command speed were equal, the outputs therefrom would not alter the setting of the throttle servo 66. But, if the outputs from the counting circuits 34 and 36 were less or greater than this output occurring with equal road and command speed output so as to reflect respectively a road speed lower than command speed and a road speed greater than command speed, the setting of the throttle servo 66 would accordingly be adjusted.

Because various applications of the system may have different requirements, it has been mentioned that only one counting circuit may be necessary. This also is true of the other circuits shown especially the amplifiers, for fewer may be needed than are demonstrated.

It is possible that for some reason, the command speed signal may be lost. As a result, the driver could be going very much in excess of the command speed and be unaware that his automatic control has been rendered ineffective by the loss of the command speed signal. Therefore, it is desirable to cause interruption of the automatic control and permit the driver to reinstate manual control. To do this, a stop relay denoted generally at 68 is installed in the system and arranged so that upon loss of the command speed signal voltage, the amplifier 64 will be rendered inoperative as by biasing one of the stages thereof beyond cutoff. As a result, supply of D.C. voltage to the throttle servo 66 will be interrupted and the throttle servo 66 can be so designed as to close the throttle under these conditions.

The invention is to be limited only by the following claims.

I claim:

1. In combination with a vehicle, a command signal generator developing a command speed signal voltage having a frequency corresponding to a desired speed, the frequency of the command speed signal voltage being selectively variable remotely of the vehicle, a vehicle road speed generator developing a vehicle road speed signal voltage having a frequency corresponding to the actual road speed of the vehicle, the command signal and road speed generators being positioned also remotely of the vehicle, counting means for correlating the frequencies of the signal voltages so as to produce an output voltage corresponding to the difference in the frequencies of the signal voltages, and means responsive to the output voltage and adapted to cause vehicle road speed to be controlled in accordance with the output voltage.

2. In combination with a vehicle, a command signal generator developing a command speed signal voltage having a frequency corresponding to desired road speed, the frequency of the command speed signal voltage being selectively variable remotely of the vehicle, a vehicle speed generator developing a vehicle road speed signal voltage having a frequency corresponding to the actual road speed of the vehicle, the command signal and road speed generators being positioned also remotely of the vehicle, means developing signal pulses corresponding in frequency, respectively, to the frequencies of the command speed and vehicle road speed signal voltages, counting means correlating the frequencies of the signal pulses so as to produce an output voltage corresponding to the difference in the frequencies of the signal pulses, and control means responsive to the output voltage and adapted to control vehicle movement thereby causing the vehicle road speed to be in some predetermined proportion to command speed.

3. In combination with a vehicle, a command signal generator developing a command speed signal voltage having a frequency corresponding to a desired speed, the frequency of the command speed signal voltage being selectively variable remotely of the vehicle, a vehicle road speed generator developing a vehicle road speed signal voltage having a frequency corresponding to actual road speed of the vehicle, the command signal and road speed generators being positioned also remotely of the vehicle, means producing pulses of a frequency corresponding to the frequency of the vehicle road speed signal voltage, means for counting the pulses at time intervals controlled by the command speed signal voltage and developing a corresponding output voltage, and control means responsive to the output voltage and adapted so as to control vehicle movement thereby causing the vehicle road speed to be in some predetermined proportion to the command speed.

4. In combination with a vehicle, a command signal generator developing a command speed signal voltage having a frequency corresponding to a desired speed, a vehicle road speed generator developing a vehicle road speed signal voltage having a frequency corresponding to actual road speed of the vehicle, the command signal and road speed generators being positioned also remotely of the vehicle, means producing peaked wave form pulses of a constant amplitude and of a frequency corresponding to the frequency of the vehicle road speed signal voltage, means producing square wave form pulses of a frequency corresponding to the frequency of the command signal voltage, counting means determining the difference between the actual proportion of the frequency of the peaked wave form pulses to the frequency of the square wave form pulses and a predetermined proportion and developing a corresponding output voltage, and control means responsive to the output voltage and adapted to control vehicle movement so that vehicle road speed is in some predetermined proportion to command speed.

5. In combination with a vehicle, a command signal generator developing a command speed signal voltage having a frequency corresponding to desired speed, the frequency of the command speed signal voltage being selectively variable remotely of the vehicle, a vehicle road speed generator developing a vehicle road speed signal voltage having a frequency corresponding to actual road speed of the vehicle, the command signal and road speed generators being positioned also remotely of the vehicle, means producing pulses of a frequency corresponding to the frequency of the vehicle road speed signal voltage, means for counting the pulses at time intervals controlled by the command speed signal voltage and developing a corresponding output voltage, control means responsive to the output voltage and adapted so as to control vehicle movement thereby causing the vehicle road speed to be in some predetermined proportion to the command speed, and stop means for halting the operation of the control means when the command speed signal voltage is interrupted.

6. In combination with a vehicle, a command signal generator developing a command speed signal voltage having a frequency corresponding to desired speed, a vehicle road speed generator developing a vehicle road speed signal voltage having a frequency corresponding to actual road speed of the vehicle, the command signal and road speed generators being positioned remotely of the vehicle, means producing peaked wave form pulses of a constant amplitude and of a frequency corresponding to the frequency of the vehicle road speed signal voltage, means producing square wave form pulses of a frequency corresponding to the frequency of the command speed signal voltage, counting means determining the difference in frequency between the vehicle road speed and command speed pulses and developing a corresponding output voltage, means for developing a D.C. voltage representative of the output voltage, and throttle means responsive to the D. C. voltage and adapted to alter throttle settings so that vehicle road speed is caused to be in some predetermined proportion to command speed.

7. A speed control system for a vehicle adapted to travel a roadway, the system comprising a command signal generator developing a carrier wave modulated in amplitude at a frequency corresponding to a desired command speed, a command signal sending transducer connected with the generator and fixed relative to the roadway for transmitting the signal energy therealong, a control signal generator developing an unmodulated carrier wave, a control signal sending transducer connected with the control signal generator and providing alternate zones of high and low control signal intensity along the roadway, a control signal receiving transducer carried by the vehicle and arranged so as to have a signal voltage induced therein modulated in amplitude at a frequency corresponding to the rate at which the control signal receiving transducer passes through the zones of high and low signal intensity, a command signal receiving transducer carried by the vehicle and arranged so as to have a signal voltage induced therein of a modulated frequency corresponding to that of the carrier wave from the command signal generator, means producing pulses of a frequency corresponding to the frequency of the control signal voltage, means counting the pulses at time intervals controlled by the command signal voltage and developing a corresponding output voltage, and control means responsive to the output voltage and adapted to control vehicle movement so that vehicle speed is caused to be in some predetermined proportion to the desired command speed.

8. A speed control system for a vehicle adapted to travel a roadway, the system comprising a command signal generator developing a carrier wave modulated in amplitude at a frequency corresponding to a desired command speed, a command signal sending transducer connected with the generator and fixed relative to the roadway for transmitting the signal energy therealong, a control signal generator developing an unmodulated carrier wave, a control signal sending transducer connected with the control signal generator and providing alternate zones of high and low control signal intensity along the roadway, a control signal receiving transducer carried by the vehicle and arranged so as to have a signal voltage induced therein modulated in amplitude at a frequency corresponding to the rate at which the control signal receiving transducer passes through the zones of high and low signal intensity, a command signal receiving transducer carried by the vehicle and arranged so as to have a signal voltage induced therein of a modulated frequency corresponding to that of the carrier wave from the command signal generator, means producing peaked wave form pulses of a frequency corresponding to the frequency of the control signal voltage, means producing square wave form pulses of a frequency corresponding to the frequency of the command signal voltage, a counting circuit arranged so as to count the peaked wave form pulses for intervals determined by the frequency of the square wave form pulses and thereby produce an output voltage corresponding to the difference between vehicle speed and command speed, and control means operated by the output voltage and adapted to control vehicle movement in accordance with the output voltage so as to cause the vehicle speed to be in some predetermined proportion to the desired command speed.

9. A speed control system for a vehicle adapted to travel a roadway, the system comprising a command signal generator developing a carrier wave modulated in amplitude at a frequency corresponding to a desired command speed, a command signal sending transducer connected with the generator and fixed relative to the roadway for transmitting the signal energy therealong, a control signal generator developing an unmodulated carrier wave, a control signal sending transducer connected with the control signal generator and providing alternate zones of high and low control signal intensity along the roadway, a control signal receiving transducer carried by the vehicle and arranged so as to have a signal voltage induced therein modulated in amplitude at a frequency corresponding to the rate at which the control signal receiving transducer passes through the zones of high and low signal intensity, a command signal receiving transducer carried by the vehicle and arranged so as to have a signal voltage induced therein of a modulated frequency corresponding to that of the carrier wave from the command signal generator, a detector circuit demodulating the control signal voltage, circuit means producing peaked wave form pulses of a frequency corresponding to the demodulated control signal voltage, a detector circuit demodulating the command signal voltage and circuit means producing square wave form pulses of a frequency corresponding to the frequency of the demodulated command frequency voltage, a counting circuit arranged so as to count the peaked wave form pulses for intervals determined by the frequency of the square wave form pulses so that an output voltage corresponding to the difference between vehicle speed and command speed is produced, means for developing a D.C. voltage representative of the output voltage, and control means operated by the D.C. voltage and adapted to control vehicle movement in accordance therewith so as to cause the vehicle speed to be in some predetermined proportion to the desired command speed.

10. A speed control system for a vehicle adapted to travel a roadway, the system comprising a command signal generator developing a carrier wave modulated in amplitude at a frequency corresponding to a desired command speed, a command signal sending transducer connected with the command signal generator and fixed relative to the roadway for transmitting the signal energy therealong, a control signal generator developing an unmodulated carrier wave, a control signal sending transducer connected with a control signal generator and providing alternate zones of high and low control signal intensity along the roadway, a control signal receiving transducer carried by the vehicle and arranged so as to have a signal voltage induced therein modulated in amplitude at a frequency corresponding to the rate at which the control signal receiving transducer passes through the zones of high and low signal intensity, a command signal receiving transducer carried by the vehicle and arranged so as to have a signal voltage induced therein of a modulated frequency corresponding to that of the carrier wave from the command signal generator, a network for producing countable pulses of a frequency corresponding to the frequency of the control signal voltage, a step by step counting circuit connected to the network and arranged so as to count the pulses for a counting interval thereby generating a stepped output voltage, reset means controlled by the frequency of the command signal voltage, the reset means being operative to establish the counting interval for the counting circuit and reset the counting circuit upon the completion of the counting interval, and vehicle control means responsive to the output voltage from the counting circuit and adapted to control vehicle movement so that vehicle speed is caused to be in some predetermined proportion to the desired command speed.

11. A speed control system for a vehicle adapted to travel a roadway, the system comprising a command signal generator developing a carrier wave modulated in amplitude at a frequency corresponding to a desired command speed, a command signal sending transducer connected with the command signal generator and fixed relative to the roadway for transmitting the signal energy therealong, a control signal generator developing an unmodulated carrier wave, a control signal developing an unmodulated carrier wave, a control signal sending transducer connected with the control signal generator and providing alternate zones of high and low control signal intensity along the roadway, a vehicle speed network including a control signal receiving transducer carried by the vehicle and arranged so as to have a signal voltage induced therein modulated in amplitude at a frequency corresponding to the rate at which the control signal receiving transducer passes through the zones, detector, amplifier, and differentiator circuits successively arranged so as to develop peaked wave form pulses of a frequency corresponding to the frequency of the control signal voltage, a command speed network including a command signal receiving transducer carried by the vehicle so as to have a signal voltage induced therein of a frequency corresponding to that of the carrier wave from the command signal generator, detector, amplifier, and amplifier inverter circuits successively arranged so as to develop square wave form pulses of a frequency corresponding to the frequency of the command signal voltage, step-by-step counting circuits each being connected both to the vehicle speed network and the command speed network so as to have the peaked wave form pulses and the square wave form pulses applied respectively thereto, the square wave form pulses to one counting circuit being taken from one side of the amplifier inverter circuit and to the other counting circuit being taken from the other side of the amplifier inverter circuit so that the square wave form pulses from the opposite sides of the amplifier inverter circuit are out of phase a predetermined amount, the counting circuits being arranged so as to count the peaked wave form pulses for intervals determined by the frequency of the square wave form pulses so that each counting circuit produces an output voltage corresponding to the difference between vehicle speed and the desired command speed, a summing circuit for combining the counting circuit output voltages so as to produce a summed voltage, means communicating with the summing circuit so as to develop a D.C. voltage corresponding to the summed voltage, and control means operated by the D.C. voltage and adapted to control vehicle movement in accordance therewith so as to cause the vehicle speed to be in some predetermined proportion to the desired command speed.

12. A speed control system for a vehicle adapted to travel a roadway, the system comprising a command signal generator developing a carrier wave modulated in amplitude at a frequency corresponding to a desired command speed, a command signal sending transducer connected with the generator and fixed relative to the roadway for transmitting the signal energy therealong, a control signal generator developing an unmodulated carrier wave, a control signal developing an unmodulated carrier wave, a control signal sending transducer connected with the control signal generator and providing alternate zones of high and low control signal intensity along the roadway, a vehicle speed network including a control signal receiving transducer carried by the vehicle and arranged so as to have a signal voltage induced therein modulated in amplitude at a frequency corresponding to the rate at which the control signal receiving transducer passes through the zones, detector, amplifier, and differentiator circuits successively arranged so as to develop peaked wave form pulses of a frequency corresponding to the frequency of the control signal voltage, a command speed network including a command signal receiving transducer carried by the vehicle so as to have a signal voltage induced therein of a frequency corresponding to that of the carrier wave from the command signal generator, detector, amplifier, and amplifier inverter circuits successively arranged so as to develop square wave form pulses of a frequency corresponding to the frequency of the command signal voltage, step-by-step counting circuits each being connected both to the vehicle speed network and the command speed network so as to have the peaked wave form pulses and the square wave form pulses applied respectively thereto, the square wave form pulses to one counting circuit being taken from one side of the amplifier inverter circuit and to the other counting circuit being taken from the other side of the amplifier inverter circuit so that the square wave form pulses from the opposite sides of the amplifier inverter circuit are out of phase a predetermined amount, the counting circuits being arranged so as to count the peaked wave form pulses for intervals determined by the frequency of the square wave form pulses so that each counting circuit produces an output voltage corresponding to the difference between vehicle speed and the desired command speed, a summing circuit for combining the counting circuit output voltages so as to produce a summed voltage, means communicating with the summing circuit so as to develop a D.C. voltage corresponding to the summed voltage, a throttle actuating servo operated by the D.C. voltage and adapted to alter throttle settings in accordance therewith so as to cause the vehicle speed to be in some predetermined proportion to the desired command speed, and stop means for halting the operation of the throttle actuating servo when the command signal voltage is interrupted.

13. In a device of the character described, the combination of a roadway having associated therewith plural sources of signal energy including a source of command speed signal energy and a source of road speed signal energy, the plural sources being so arranged relative to the roadway as to cause the signal energy to emanate from the roadway, a vehicle carried command speed pickup means and a vehicle carried road speed pickup means respectively responsive to the signal energy from the command speed and the road speed signal energy sources so as to provide both a command speed signal having a frequency corresponding to desired speed and a vehicle road speed signal having a frequency corresponding to actual vehicle road speed, counting means correlating the frequencies of the signals so as to produce an output signal corresponding to the difference in frequency of the command speed and road speed signals, and means responsive to the output voltage and adapted to cause vehicle road speed to be controlled in accordance with the output signal.

14. In a device of the character described, the combination of a roadway having associated therewith plural sources of signal energy, the plural sources being so arranged relative to the roadway as to cause the signal energy to emanate from the roadway, one of the sources being selectively variable so as to provide a desired command speed signal, another of the sources affording a road speed signal, a vehicle carried command speed and road speed pickup means each responsive to the signal energy from its associated source so as to provide respectively a command speed signal having a frequency corresponding to desired speed and a vehicle road speed signal having a frequency corresponding to actual vehicle road speed, means producing pulses of a frequency corresponding to the frequency of the vehicle road speed signal, means counting the pulses at time intervals controlled by the command speed signal and developing a corresponding output signal, and control means responsive to the output signal and adapted so as to control vehicle movement and thereby cause the vehicle road speed to be in some predetermined proportion to the command speed.

15. In a device of the character described, the combination of a roadway having associated therewith plural sources of signal energy, the plural sources being so arranged relative to the roadway as to cause the signal energy to emanate from the roadway, one of the sources being selectively variable so as to provide a desired command speed signal voltage, another of the sources affording a road speed signal voltage, a throttle controlled vehicle carried command speed and road speed pickup means each responsive to the signal energy from its associated source so as to provide respectively a command speed signal voltage having a frequency corresponding to desired speed and a vehicle road speed signal voltage having a frequency corresponding to actual vehicle road speed, means producing pulses of a constant amplitude and of a frequency corresponding to the frequency of the vehicle road speed signal voltage, means producing pulses of a frequency corresponding to the frequency of the command speed signal voltage, counting means determining the difference in frequency between the vehicle road speed and command speed pulses and developing a corresponding output voltage, and means responsive to the output voltage and adapted to alter throttle settings so that vehicle road speed is caused to be in some predetermined proportion to command speed.

References Cited in the file of this patent
UNITED STATES PATENTS

| | | |
|---|---|---|
| 1,767,609 | Murray | June 24, 1930 |
| 2,454,659 | Leonard | Nov. 23, 1948 |
| 2,493,755 | Ferrill | Jan. 10, 1950 |
| 2,576,424 | Sunstein | Nov. 27, 1951 |
| 2,661,070 | Ferrill | Dec. 1, 1953 |
| 2,803,743 | Ballerait | Aug. 20, 1957 |
| 2,883,975 | Spetner | Apr. 28, 1959 |